US009677631B2

(12) United States Patent
Park et al.

(10) Patent No.: US 9,677,631 B2
(45) Date of Patent: Jun. 13, 2017

(54) ELECTRO-MECHANICAL BRAKE DEVICE

(71) Applicant: Daegu Gyeongbuk Institute of Science and Technology, Daegu (KR)

(72) Inventors: Tae Sang Park, Daegu (KR); Choong Pyo Jeong, Daegu (KR); Seong Hun Lee, Daegu (KR); Dong Hoon Ban, Busan (KR); Jae Seung Hong, Gyeongsangnam-do (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 15/099,566

(22) Filed: Apr. 14, 2016

(65) Prior Publication Data

US 2017/0114848 A1      Apr. 27, 2017

(30) Foreign Application Priority Data

Oct. 27, 2015  (KR) ........................ 10-2015-0149528

(51) Int. Cl.
| | |
|---|---|
| *F16D 65/18* | (2006.01) |
| *F16D 55/225* | (2006.01) |
| *B60T 1/00* | (2006.01) |
| *F16D 121/24* | (2012.01) |
| *F16D 125/48* | (2012.01) |

(52) U.S. Cl.
CPC .............. *F16D 65/18* (2013.01); *B60T 1/005* (2013.01); *F16D 55/225* (2013.01); *F16D 2121/24* (2013.01); *F16D 2125/48* (2013.01)

(58) Field of Classification Search
CPC .... F16D 65/18; F16D 55/225; F16D 2121/24; F16D 2127/06; F16D 2125/50; B60T 1/005; B60T 13/746; B60T 7/122
See application file for complete search history.

(56) References Cited

U.S. PATENT DOCUMENTS

| | | | | |
|---|---|---|---|---|
| 4,175,646 | A * | 11/1979 | Eikelberger | .......... B60T 13/745 188/156 |
| 2003/0116388 | A1 * | 6/2003 | Drennen | ................. F16D 65/18 188/72.1 |
| 2008/0053760 | A1 * | 3/2008 | Oikawa | ................. B60T 13/745 188/72.4 |
| 2009/0065311 | A1 | 3/2009 | Kim | |
| 2009/0071769 | A1 | 3/2009 | Cheon | |
| 2010/0140028 | A1 | 6/2010 | Kim et al. | |

(Continued)

FOREIGN PATENT DOCUMENTS

| | | |
|---|---|---|
| KR | 10-2009-0064220 A | 6/2009 |
| KR | 10-2010-0030012 A | 3/2010 |

(Continued)

*Primary Examiner* — Vishal Sahni
(74) *Attorney, Agent, or Firm* — Revolution IP, PLLC

(57) ABSTRACT

Disclosed is an electro-mechanical brake device, including: a disk; a pair of brake pads respectively disposed at both sides of the disk; a caliper respectively disposed inside the pair of brake pads; a brake module portion disposed at one side of the caliper; and a parking brake portion that is disposed to be perpendicular to a motor shaft of the brake module portion and is connected to a parking brake switch that is operated by a driver, and selectively controls a rotation of the motor shaft depending on the operation of the parking brake switch.

2 Claims, 4 Drawing Sheets

(56) References Cited

U.S. PATENT DOCUMENTS

| | | | |
|---|---|---|---|
| 2014/0000992 A1* | 1/2014 | Tajima | F16D 65/18 188/72.1 |
| 2015/0152928 A1 | 6/2015 | Yoon | |
| 2015/0167761 A1 | 6/2015 | Son et al. | |
| 2015/0345580 A1 | 12/2015 | Jung | |

FOREIGN PATENT DOCUMENTS

| KR | 10-2010-0030285 A | 3/2010 |
|---|---|---|
| KR | 10-2014-0070435 A | 6/2014 |
| KR | 10-1511437 B1 | 4/2015 |

* cited by examiner

ELECTRO-MECHANICAL BRAKE DEVICE

CROSS-REFERENCE TO RELATED APPLICATION

This application claims priority to and the benefit of Korean Patent Application No. 10-2015-0149528 filed in the Korean Intellectual Property Office on Oct. 27, 2015, the entire contents of which are incorporated herein by reference.

BACKGROUND

The present invention relates to electro-mechanical brake device. More particularly, the present invention relates to an electro-mechanical brake device that enables it to sustain braking force in a power-off condition and can realize a parking brake in a power-off condition, that is, a parking mode.

Generally, a brake device of a vehicle decelerates or stops a running vehicle, and further it is a braking device that enables the vehicle to be a parking condition.

In general, there is a friction type of a brake device that transforms a moving energy to heat energy that is radiated to the atmosphere, wherein hydraulic pressure presses a pair of brake pads of both sides toward a brake disk that rotates with a wheel to make it perform a braking function.

However, because the hydraulic type brake device uses a hydraulic pressure that presses brake pads toward a disk side, and therefore there is a drawback that a device configuration is complicated.

That is to say, a conventional hydraulic type brake device needs a master cylinder that is operated by a booster that increases a pedal operation force to generated hydraulic pressure, and a hydraulic pressure line that is connected to a wheel cylinder as well as various complicated devices that controls and assists them, and thus there is a weakness that a predetermined limitation exists on improving reliability and stability of braking performance from the crowdedness and the hydraulic usage.

Recently, due to the above problem, an electro-mechanical brake device (EMB) has been being mainly used to pursue a simplification of a device configuration that a conventional hydraulic type brake cannot have and can improve braking performance reliability and can realize a parking brake function.

The said electro-mechanical brake device uses a motor as a power source, uses a gear speed reducer to amplify torque of the motor, and includes a structure that transforms a rotation movement to a line motion by using a ball screw, and so on.

An electro parking brake (EPB) function is necessary for a parking brake of the electro-mechanical brake device (EMB), and a structure such as a solenoid and a ratchet is mainly used to realize the electro parking brake (EPB) function, due to a characteristic that using a power transmission device such as a ball-screw that power transmission efficiency is high and a friction coefficient is low to realize a braking.

As a conventional art having the above structure, Patent Laid-Open Publication No. 10-2010-0030285 (2010 Mar. 18) is disclosed, in particularly, an electro-mechanical brake (EMB) presses a brake pad more than a press force that is necessary for a parking brake and a power of a solenoid is turned on or turned off, and an instrument of a ratchet shape is operated to maintain the braking force.

However, the conventional art has to a size larger than a conventional hydraulic type caliper, because of this, the size and the weight of an electro-mechanical brake device becomes more larger, a solenoid, a latch and a gear are used together with a gear inside a gear reducer, thus there is a drawback that the structure configuration becomes complicated and the volume thereof becomes larger, and further there is a problem in an aspect of an assembly characteristics and vehicle packaging layout.

Meanwhile, there is a push type and a pull type in a solenoid, and the type is divided by conditions that an operation direction is push direction and an operation direction is pull direction when a power is turned on. When a push type is applied to a parking brake mechanism, a solenoid power is continuously maintained during a parking brake condition to have a vehicle battery exhausted.

On the contrary, when a pull type is applied to a parking brake mechanism, a solenoid power is continuously maintained during a running condition to have a parking brake condition.

In this condition, when a solenoid is turned off by a condition that cannot be predicted such as short cut of a power line of a vehicle, the solenoid is moved to an opposite direction by a compression spring, and there is a danger that a ratchet or an operating portion can be damaged.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an electro-mechanical brake device having a solenoid that is operated by a parking brake switch of a user and a parking brake portion having a toggle that is inserted or drawn out by one-touch method, when the solenoid is operated once (ON-OFF), a parking brake is performed, when the solenoid is operated once more (ON-OFF), a parking brake is released, and further when a parking brake is performed or released, it does not needs a continuous power so as to maintain one condition (parking brake condition or parking brake release condition), and a safe braking condition of a wheel is maintained when a power is not supplied.

An electro-mechanical brake device according to the present invention may include a disk that is disposed at one side of a wheel of a vehicle and is rotated together with the wheel, a pair of brake pads that are respectively disposed at an outer side and an inner side of the disk and brakes the rotating disk through a friction force proportional to a rate that contacts the disk, a caliper that is respectively disposed inside the pair of brake pads, a brake module portion that is disposed at one side of the caliper, a motor shaft of a motor rotates depending on an operation of a brake pedal of a user, a torque of the motor shaft offers a contact rate that presses the brake pad to an inner surface of a disk, and a repulsive force that is generated when an inner side brake pad contacts the disk moves the caliper to an inner side direction of the disk, and offers a contact rate that has an outer side brake pad contact an outer side surface of the disk, and a parking brake portion that is disposed to be perpendicular to the motor shaft of the brake module portion and is connected to a parking brake switch that is operated by a driver, and selectively controls a rotation of the motor shaft depending on the operation of the parking brake switch.

The brake module portion may include a gear box that is connected to a motor gear of the motor shaft through a gear, and reduces a rotation speed of a motor shaft torque to increase an output torque, and a press portion that offers a press pressure to push the brake pad to the inner side of the disk through a length extension that is generated while a rotation movement of a torque outputted from the gearbox is transformed to a line motion.

The parking brake portion may include a solenoid that applies a physical force downwards through an electrical signal from a parking brake switch that is operated by a driver, and a toggle that is disposed at a lower portion of the solenoid, and pushes or draws a stopper that is engaged with a motor gear by using a physical force of the solenoid to selectively regulate a rotation of the motor shaft.

The toggle may include a housing of which an upper surface is opened to have a cylindrical shape and a closed portion of a lower surface has an inlet-outlet hole that is formed on a center thereof, a plunger that is disposed in the housing, selectively moves up and down, and a stopper is formed downwards at a center of a lower surface and moves up and down through the inlet-outlet hole of the housing, a spring that is disposed between a lower surface of the housing and a lower surface of the plunger and offers an elastic force to the plunger such that the plunger is supported to be returned to an return position, a rotation motion element that is disposed on a plane surface of the plunger in the housing and a plurality of flanges are upwards formed on an upper surface to be radially disposed based on a center, an vertical movement guide that is fixed on an upper side of an inner portion of the housing, locking jaws that are slanted in one side direction are formed along a circumference direction of a lower end, and a guide groove that is cut upwards from an end of one of the locking jaws is formed to have a predetermined interval.

An electro-mechanical brake device according to the present invention has following effects.

First, a solenoid that is operated by a parking brake switch of a user and a parking brake portion having a toggle that is inserted or drawn out by one-touch method are disposed, when the solenoid is operated once (ON-OFF), a parking brake is performed, when the solenoid is operated once more (ON-OFF), a parking brake is released, and further when a parking brake is performed or released, and thus there is an effect that it does not need continuous power so as to maintain one condition (parking brake condition or parking brake release condition) and a safe braking condition of a wheel is maintained when a power is not supplied.

Second, a parking brake portion is disposed at a side of a motor shaft of a motor and a rotation of a motor shaft and a motor gear that generates minimum torque before a torque is increased by a gear box is controlled, and thus there is an effect that minimum force can realize a parking brake.

DETAILED DESCRIPTION

Figure 1:
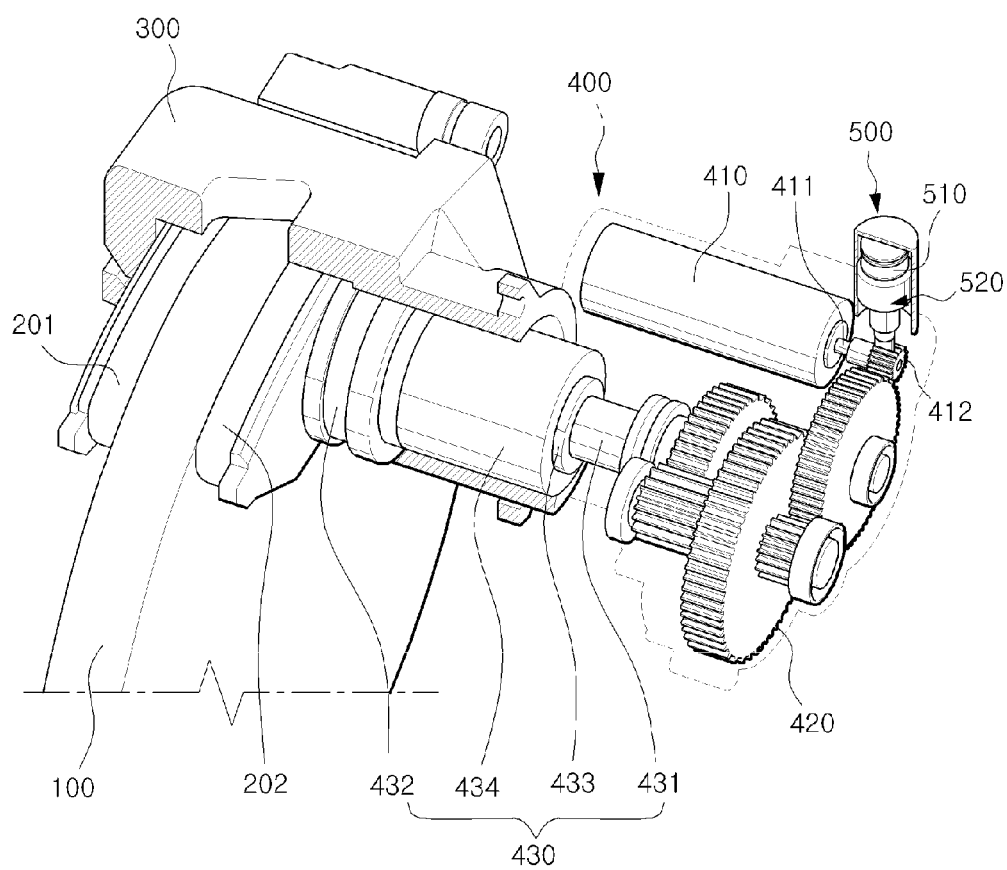
FIG. 1 is an illustration showing an electro-mechanical brake device in according to a first embodiment of the present invention.

Hereinafter, referring to the drawings, a desirable exemplary embodiment will be described in detail according to the present invention.

Prior to making the description, the terms or words used in the specification and claims of the present invention are not interpreted using typical or dictionary limited meanings, and are constructed as meanings and concepts conforming to the technical spirit of the present invention based on the principle that the inventors can appropriately define the concepts of the terms to explain the present invention in the best manner.

Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

The present invention relates to an electro-mechanical brake device having a solenoid that is operated by a parking brake switch of a user and a parking brake portion having a toggle that is inserted or drawn out by one-touch method, when the solenoid is operated solitarily (ON-OFF), a parking brake is performed, when the solenoid is operated one more solitarily (ON-OFF), a parking brake is released, and further when a parking brake is performed or released, it does not needs a continuous power so as to maintain one condition (parking brake condition or parking brake release condition), and a safe braking condition of a wheel is maintained when a power is not supplied, and will be described with reference to the drawings as follows.

Figure 2:
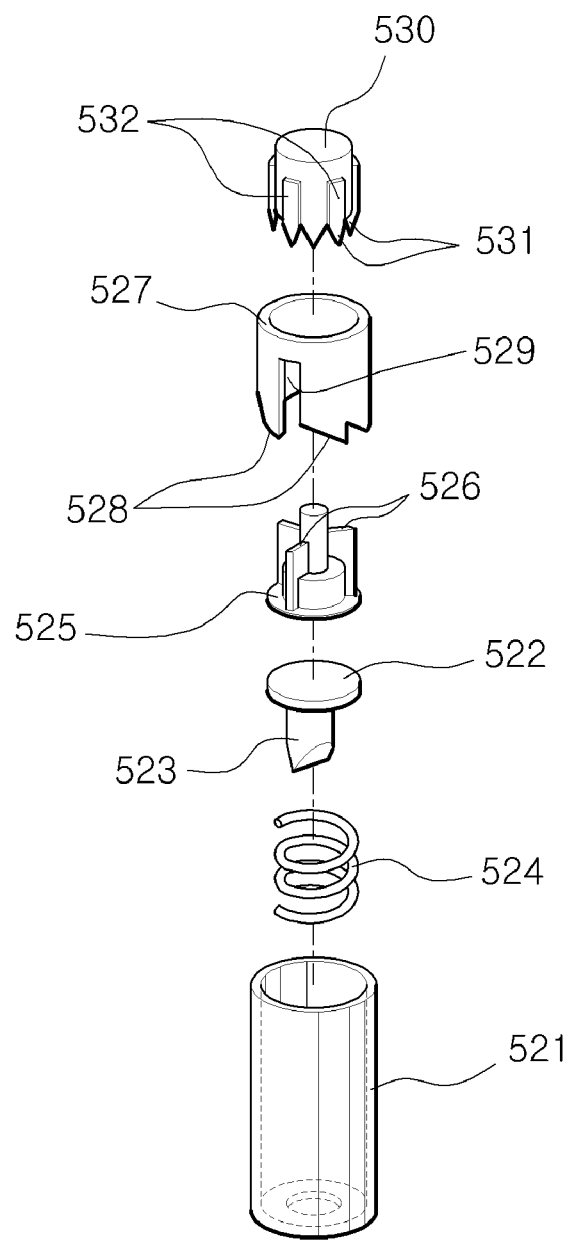
FIG. 2 is an exploded perspective view showing a toggle of a parking brake portion according to a first embodiment of the present invention.
Figure 3:
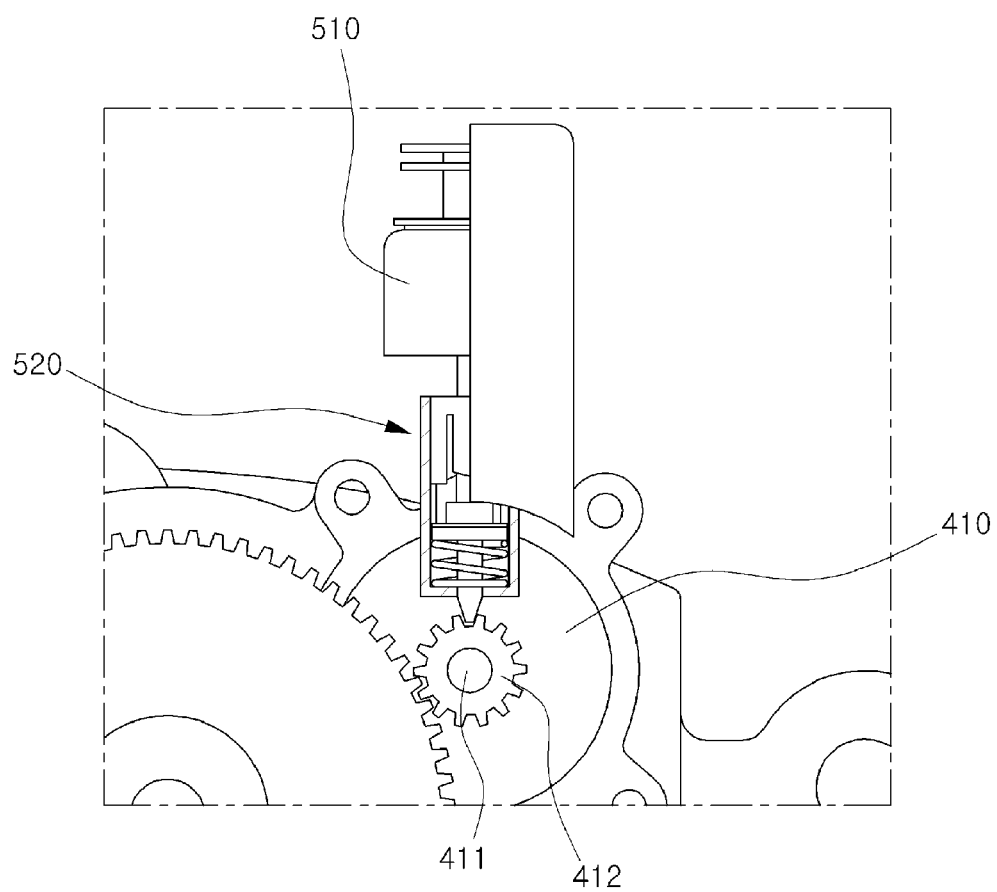
FIG. 3 is an illustration showing an installation condition of a parking brake portion according to a first embodiment of the present invention.

Referring to FIG. 1 to FIG. 3, an electro mechanical brake device according to the present invention includes a disk 100, a pair of brake pads 201 and 202, a caliper 300, a brake module portion 400, and a parking brake portion 500, and firstly a disk 100 is disposed at one side of a wheel of a vehicle and rotates together with the wheel.

In this condition, the disk 100 has a circular plate shape such as a conventional brake disk, and the detailed description of a structure and a function of the conventional brake disk will be omitted.

And, brake pads 201 and 202 are disposed at an outer side and an inner side of the disk 100 and they brake the disk 100 through a friction force that is proportional to a contact force between the pair of brake pads 201 and 202 and the disk 100.

In this condition, a brake pad that is disposed at an outer surface of the disk 100, which a brake module portion 400 and a parking brake portion 500 are not disposed, is called an outer brake pad 201 and a brake pad that is at an inner surface of the disk 100, which the brake module portion 400 and the parking brake portion 500 are disposed, is called as an inner brake pad 202 in the present invention.

It is desirable that the above brake pads 201 and 202 generate a friction force that is proportional to a surface contact force with the disk 100, and the friction force that is generated thereby brakes the disk 100.

Also, the brake pads 201 and 202 are fixed by a caliper 300, and a pair of brake pads 201 and 202 is disposed across the disk 100.

In this condition, a brake module portion 400 is disposed at one side of the caliper 300, the brake module portion 400 rotates a motor shaft 411 of a motor 410 depending a brake pedal operation force of an user to press an inner brake pad 202 toward a disk 100 through a torque of a motor shaft 411, a repulsive force that is formed by a contact force of the inner brake pad 202 and the disk 100 moves the caliper 300 toward an inner side direction of the disk 100, and an outer brake pad 201 is pressed to an outer side of the disk 100 such that a wheel is braked.

Here, a motor 410 is disposed in the brake module portion 400 and uses a power that is supplied from an outside to rotate a motor shaft 411, a motor gear 412 is engaged with a motor shaft 411 of the motor 410, a gear box 420 is gear-connected to the motor gear 412 to receive a torque of the motor shaft 411 through a motor gear 412, and the gear box 420 outputs increased torque by reducing a rotation speed of a motor torque.

And, a torque that is outputted from an output side of the gearbox 420 is outputted to a press portion 430, and the press portion 430 presses the inner brake pad 202 toward the disk 100 through a length increment that is formed by transforming a rotation movement to a straight movement.

In more detail, the press portion 430 includes a ball screw shaft 431, a ball screw nut 433, a nut cap 434, and a head 432, a screw groove that a steel ball can moved in an axial direction is formed on an external circumferential surface of the ball screw shaft 431, one side thereof is connected to an output side of the gear box 420 to be rotated in one side direction or the other side direction by a torque outputted from an output side of the gear box 420.

In this condition, a ball screw nut 433 having steel balls is disposed on an external circumference of the ball screw shaft 431, when the ball screw shaft 431 is rotated in one direction or the other direction, the nut 433 moves forward or reward along an axial direction of the ball screw shaft 431 to transform a rotation movement to a straight movement.

And, a nut cap 434 is screw-engaged on an external circumference of the ball screw nut 433, a screw that is formed on external circumferential surface of the ball screw nut 433 and a screw that is formed on an interior circumference of the nut cap 434 have an opposite direction to a screw of the ball screw shaft 431, for example, a screw of the ball screw shaft 431 has a right-handed, and a screw of an external circumferential surface of the ball screw nut 433 and a screw of an interior circumference of the nut cap 434 has a left-handed.

In the above configuration, if the ball screw shaft 431 is rotated by one direction, the ball screw nut 433 moves backward along an axial direction (to a gear box side), the nut cap 434 moves forward along an axial direction (to a disk side), an engagement length the ball screw nut 433 and the nut cap 434 is increased, a head 432 that is formed at an end of the nut cap 434 presses an inner brake pad 202 to a disk 100, a repulsive force is generated in an opposite direction to a movement direction of the nut cap 434 due to an engagement length increment of the ball screw nut 433 and the nut cap 434, the caliper 300 is moved to a gear box 420 by the repulsive force, and an outer brake pad 201 is pressed to a disk 100.

And, if the ball screw shaft 431 is rotated in the other direction, the ball screw nut 433 moves forward along an axial direction (to a disk side), the nut cap 434 moves back along an axial direction (to a gear box side), an engagement length of the ball screw nut 433 and the nut cap 434 is decreased, and the pressure that is applied to brake pads 201 and 202 is eliminated to release the braking of the disk 100.

Here, it is desirable the nut cap 434 is fixed to one side of the caliper 300 such that it does not perform a rotation movement but perform a straight movement.

Accordingly, when an engagement length of the ball screw nut 433 and the nut cap 434 is extended or contracted, the disk is braked or released.

Thus, in accordance with a brake pedal operation of an user, if a motor shaft 411 of a motor 410 is rotated, a torque of the motor shaft 411 is transmitted to a gear box 429 through a motor gear 412, and the gearbox 420 reduces a rotation speed transmitted from the motor gear 412 to output the increased torque to a press portion 430 through an output side.

In this moment, a ball screw shaft 431 of the press portion 430 is rotated one direction or the other direction by a torque outputted from the gear box 420, a head 432 that is formed at one side end of the nut cap 434 is moved to an inner side of a disk 100, the head 432 presses an inner brake pad 202 to the disk 100, the inner brake pad 202 contacts an inner surface of the disk 100, a repulsive force that is generated by an engagement length increment of the ball screw nut 433 and the nut cap 434 moves a caliper 300 to an inner side direction, an outer brake pad 201 contact an outer surface of a disk 100, and the disk 100 is braked.

Also, a parking brake portion 500 is disposed perpendicularly to a motor shaft 411 of the brake module portion 400, and is connected to a parking brake switch that is operated by a driver, when the parking brake switch is operated by a driver, a rotation of the motor shaft 411 of the motor 410 is controlled, and the parking brake portion 500 has a one-touch toggle method.

In more detail for the parking brake portion 500, a solenoid 510 is disposed to apply physical force to a lower direction of a parking brake switch that is operated by a driver, a toggle 520 is disposed at a lower portion of the solenoid 510, and when the solenoid 510 applies physical force, a stopper 523 that is engaged with a motor gear 412 of the motor shaft 411 is drawn out to control a rotation of the motor shaft 411.

In this moment, the solenoid 510 is electrically connected to a parking brake switch that is operated by a driver to be operated by an electric signal, but it is not limited thereto, the solenoid can be connected thereto to be operated by a physical signal.

Accordingly, the parking brake portion 500 is disposed at a motor shaft 411 of a motor 410, and a parking brake is realized by controlling a rotation of a motor shaft 411 and a motor gear 412 that generates minimum torque before a torque is increased by a gear box 420.

In this condition, the solenoid 510 that is operated by an electric signal, a physical force that is applied to a toggle 520 is generated at one time such as cam movement, if the solenoid 510 applies physical force once, the toggle 520 draws out a stopper 523 to be engaged with a motor gear 412 and a rotation of the motor shaft 411 and the motor gear 412 is limited, and if the solenoid 510 again applies physic force, the toggle 520 inserts or receives a stopper 523 to separate the stopper 523 from the motor gear 412, and simultaneously release the rotation limitation of the motor shaft 411 and the motor gear 412 such that the parking brake portion 500 is realized by one-touch method.

A housing 521 of which the upper is opened is disposed at the toggle 520, a lower surface of the housing 521 has a closed surface unlike an upper surface, and an inlet/outlet hole is formed at a center of a lower surface such that the toggle 520 performs the above function.

And, a plunger 522 is disposed at an inner portion of the housing 521, the plunger 522 has a circular plate type and moves up and down direction in the housing 521, and a wedge type stopper 523 is downwardly formed at a center of a lower surface of the circular plate type plunger 522 to be drawn out or inserted through the inlet/outlet hole of the housing 521.

Accordingly, when the plunger 522 moves up or down in the housing 521, a stopper 523 is protruded or inserted through the inlet/outlet hole of the housing 521.

And, a spring 524 is disposed between a lower surface of the housing 521 and a lower surface of a plunger 522, an elastic force is applied to the plunger 522, a rotation motion element 525 is disposed on a plane surface of the plunger 522 in the housing 521, and a plurality of flanges 526 that is extended upward are disposed in a radial direction on an upper surface of the rotation motion element 525.

It is desirable that the spring 524 has a coil spring type, and a slant surface that is slant to one side is formed at each upper end of a plurality of flanges 526 that is disposed in a radial direction at an upper surface of the rotation motion element 524.

Also, an up/down movement guide 527 is fixed inside an upper side of the housing 521, the up/down movement guide 527 has a locking jaws 528 that is slant corresponding to a slant surface that is formed along a circumference of a lower end of the flange 526, and a guide groove 529 that is cut out from an end to an upper side of a locking jaw is formed at one locking jaw 528 of the above locking jaws 528.

A vertical motion element 530 is disposed at an upper portion of the rotation motion element 525 in the housing 521 to move up and down direction in the housing 521, a crown 30 such as a gear corresponding to an upper end of flanges 526 of the rotation motion element 525 is formed at an lower end of the vertical motion element 530, and a plurality of protrusion 531 is formed to sequentially correspond to a locking jaw 528 and a guide groove 529 while it moves along a lower end of the vertical motion guide 527 along an external circumferential surface.

Figure 4:
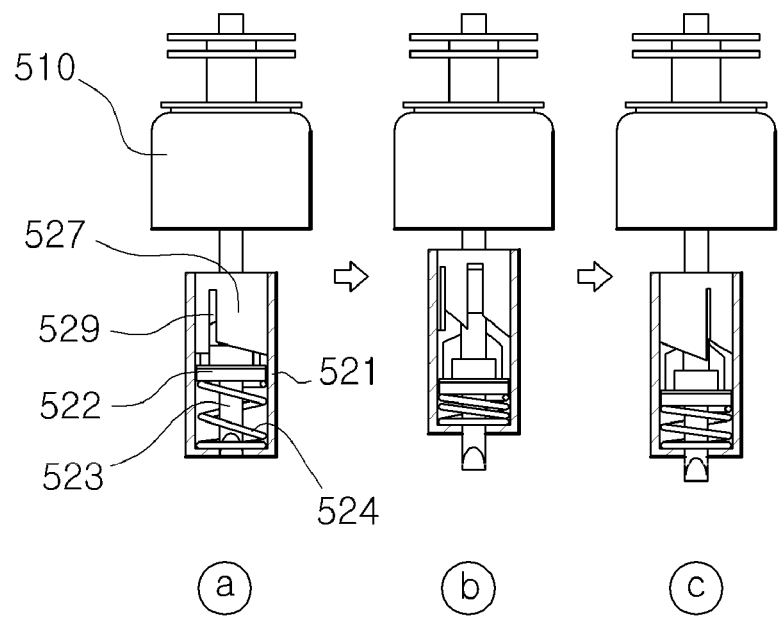
FIG. 4 is an illustration showing an implementation condition of a toggle of a parking brake portion according to a first embodiment of the present invention.
Figure 4:
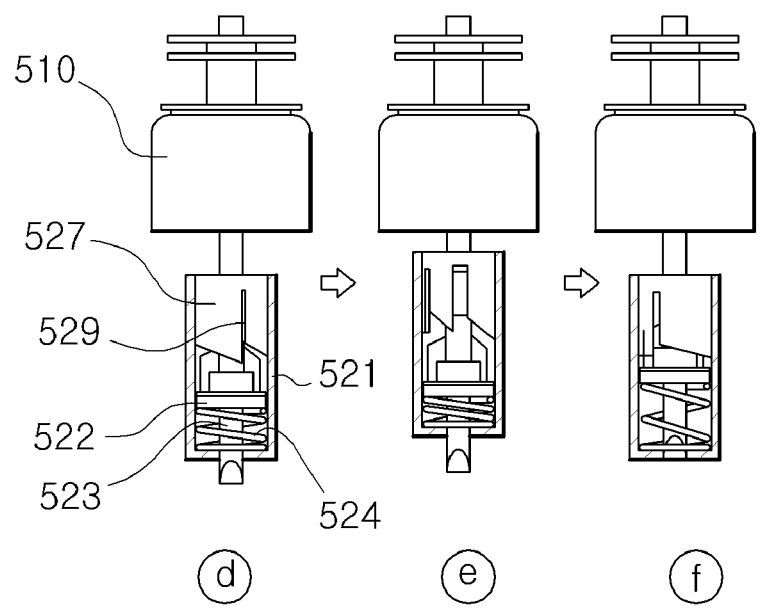

An exemplary embodiment of a toggle 520 according to the above configuration will be described hereinafter, (d) to (d) of FIG. 4 shows a condition that a stopper of a parking brake portion is engaged with a motor gear, (d) to (f) of FIG. 4 shows a condition that a stopper of a parking brake portion is separated from a motor gear, if a press force (solitary physical force) that is generated by a solenoid 510 is applied to a vertical motion element 530 that is disposed at an uppermost of a toggle 520, the vertical motion element 530 moves in a straight line along an vertical motion guide 527 to sequentially press the rotation motion element 525 and the plunger 522 downward.

And, a repulsive force is formed between a vertical motion element 530 and a rotation motion element 525 by a spring 524 between a housing 521 and a plunger 522, a protrusion 532 of the vertical motion element 530 separated from a lower end of the vertical motion guide 527, slant surfaces of a rotation motion element 525 and a vertical motion element 530 face from each other, and a rotation motion element 525 rotates along a slant surface, if a press force of the vertical motion element 530 is eliminated, a protrusion 532 of a rotation motion element 525 is positioned in a locking jaw 528 or a guide groove 529 that are sequentially formed on the vertical motion guide 527.

Accordingly, a parking brake is realized by a following step, after a disk 100 is braked by a brake module portion 400, a parking brake portion 500 is operated, a rotation of a motor shaft 411 and a motor gear 412 of a brake module portion 400 is controlled, a braking condition is maintained, and thus it does not a separate power to maintain a braking and a minimum energy is used to realize a parking brake, because a rotation is controlled at an initial torque generation point before a torque is increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electro-mechanical brake device, comprising:
a disk disposed at one side of a wheel of a vehicle, the disk rotated together with the wheel;
a pair of brake pads including an outer brake pad and an inner brake pad respectively disposed at an outer side and an inner side of the disk, the pair of brake pads braking the rotating disk through a friction force;
a caliper fixing the pair of brake pads;
a brake actuator module portion disposed at one side of the caliper, the brake actuator module portion rotating a motor shaft of a motor through a torque of the motor shaft offering a pressing force that presses the inner brake pad to an inner surface of the disk, wherein a repulsive force generated when the inner brake pad contacts the disk moves the caliper to an inner side direction of the disk, and provides a pressing force to bring the outer brake pad into contact with the outer side surface of the disk; and
a parking brake portion disposed to be perpendicular to the motor shaft of the brake actuator module portion, the parking brake portion being connected to a parking brake switch operated by a driver, and selectively controlling a rotation of the motor shaft depending on the operation of the parking brake switch,
wherein the parking brake portion includes:
a solenoid applying a physical force downwards through an electrical signal from the parking brake switch; and
a toggle disposed at a lower portion of the solenoid, the toggle pushing or drawing a stopper that is engaged with a motor gear by using the physical force of the solenoid to selectively regulate the rotation of the motor shaft,
wherein the toggle includes:
a housing including an upper surface opened, and a lower surface closed, the lower surface having an inlet-outlet hole that is formed on a center of the lower surface,
a plunger disposed in the housing and selectively moving up and down, wherein the stopper is formed downwards at the center of the lower surface and moves up and down through the inlet-outlet hole;
a spring disposed between the lower surface of the housing and a lower surface of the plunger, the spring offering an elastic force to the plunger such that the plunger is supported to be returned to a return position;
a rotation motion element disposed on a plane surface of the plunger;
a plurality of flanges disposed in a radial direction on an upper surface of the rotation motion element;
an vertical movement guide fixed on an upper side of an inner portion of the housing;
locking jaws formed to be slanted in one side direction along a circumference direction of a lower end the plurality of flanges;

a guide groove being cut upwards from an end of one of the locking jaws;

a vertical motion element disposed at an upper portion of the rotation motion element, the vertical motion element moving up and down in the housing;

a crown corresponding to an upper end of the plurality of flanges formed along a lower end of the vertical motion element; and a plurality of protrusions corresponding to the locking jaws and the guide groove formed along an external circumferential surface of the vertical motion element.

2. The electro-mechanical brake device of claim 1, wherein:

the brake actuator module portion includes:

a gear box connected to a motor gear of the motor shaft through a gear, and reducing a rotation speed of a motor shaft torque to increase an output torque; and a press portion offering a pressing force to push the inner brake pad to the inner side of the disk through a length extension that is generated while a rotation movement of a torque outputted from a gearbox is transformed to a line motion.

\* \* \* \* \*